Figure 1:
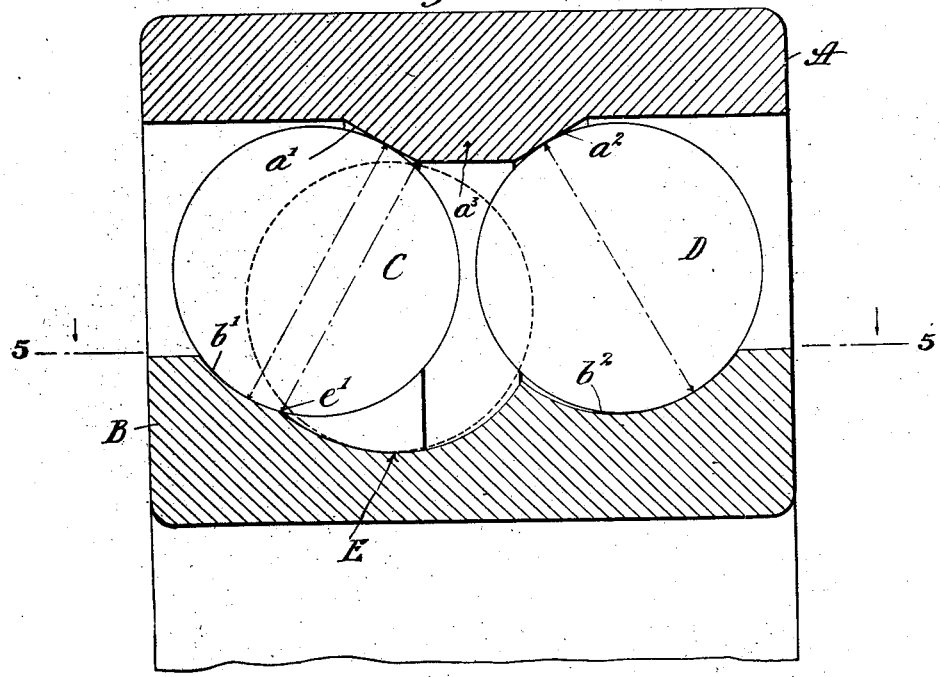

H. HESS.
ANTIFRICTION BEARING.
APPLICATION FILED SEPT. 24, 1909.

1,027,541.

Patented May 28, 1912.
2 SHEETS—SHEET 1.

Witnesses:

Inventor:
HENRY HESS,
By his Attorneys

H. HESS.
ANTIFRICTION BEARING.
APPLICATION FILED SEPT. 24, 1909.
1,027,541.
Patented May 28, 1912.
2 SHEETS—SHEET 2.
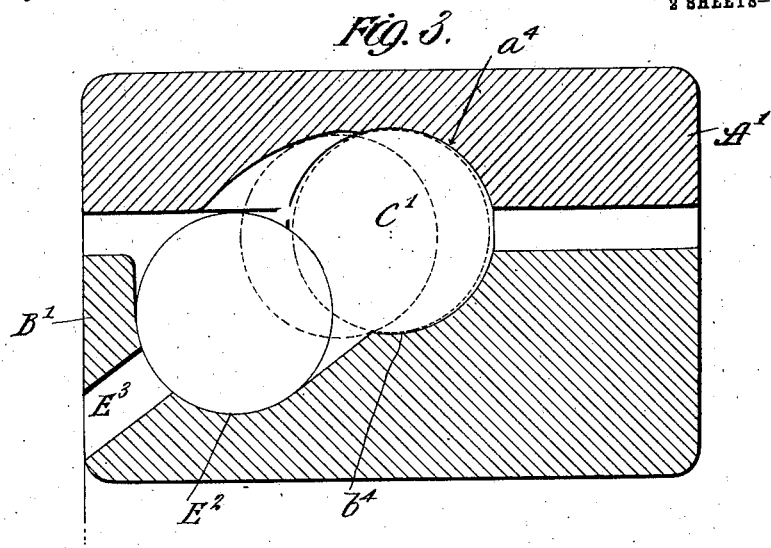
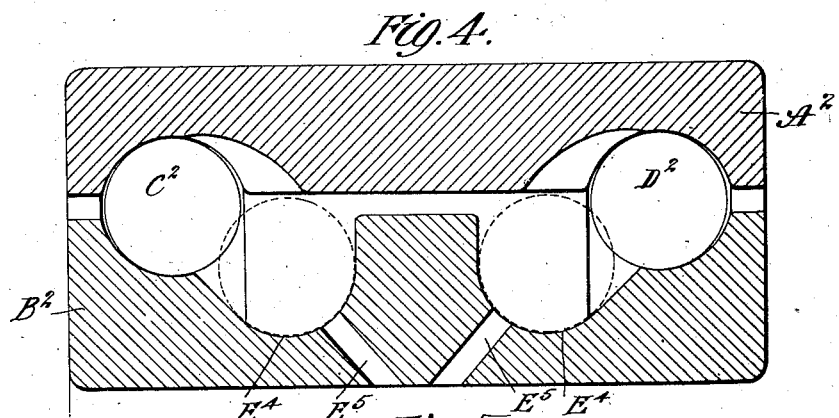
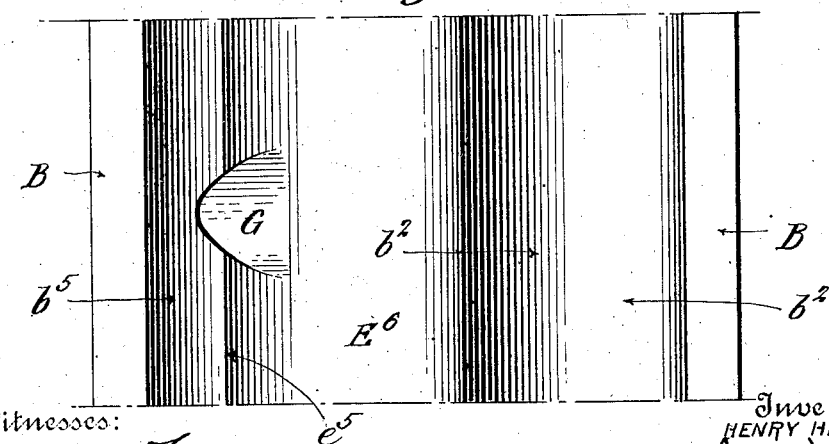
Witnesses:
Inventor:
HENRY HESS,
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

ANTIFRICTION-BEARING.

1,027,541. Specification of Letters Patent. Patented May 28, 1912.

Application filed September 24, 1909. Serial No. 519,315.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

My invention relates to anti-friction bearings, and more particularly to that type thereof wherein the raceway is continuous and uninterrupted by filling openings and the like. As is well known in the art, various methods of assembling such bearings have been employed. For instance, in the "silent" type, the parts are sometimes assembled and disassembled by the eccentric displacement of the casing members in accordance with the well-known Conrad method, and sometimes by the use of filling openings, and in other well-known ways. In bearings of the "full" type, various expedients have been also resorted to, such for instance as forming one or more of the casing members in sections, or by the provision of filling openings, and the like, all of which are undesirable for various reasons.

It is one of the purposes of my present invention to provide casing members which are integral and uninterrupted, so far as their external contour is concerned, and I therefore form a supplemental recess in the interior portion of one or the other of them, that is to say, in the surface between the two casing members where the tracks or ways are formed. More specifically, I prefer to form this interior recess as a circumferential groove in proximity to the raceway and communicating therewith, so that the rolling elements may be transferred from one to the other. By this arrangement I secure great convenience in assemblage, as the rolling elements may be first located in the recess, and in such manner that the other casing member may be readily passed thereover, after which the rolling elements are transferred from the recess to the raceway and thereby the parts are held together and locked, so as to constitute what is known in the art as a "unit handling" bearing, and thus entirely dispensing with the use of the several expedients before mentioned, even though the bearing in question be of the full or substantially the full type.

In my preferred form I have shown the invention as applied to a bearing as illustrated and described in an application for Letters Patent of Fred E. Bright, Serial No. 501,531, filed June 11, 1909, wherein I have found that the use of my principle is particularly advantageous. However, I do not confine myself to this type, as it is obviously applicable to anti-friction bearings of other forms; and generally speaking, I do not desire to limit myself to any particular embodiment or details except in so far as such limitations are specified in the claims.

Figure 2:
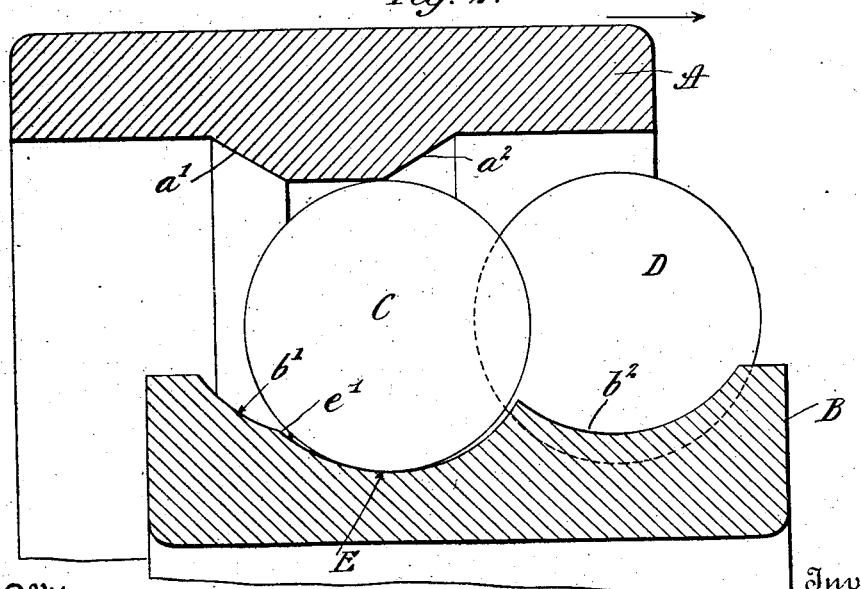

Referring to the drawings: Figure 1 is a transverse sectional view of a two-series bearing of the type referred to, showing my invention applied thereto. Fig. 2 is a similar view indicating more particularly the arrangement of the several parts during assemblage. Fig. 3 is a similar view of a one-series bearing having my invention applied thereto. Fig. 4 is a similar view illustrating a modified form of two-series bearing with the interior recess or groove duplicated therein; and Fig. 5 is a sectional detail view of a modified form, taken substantially on the line 5—5 in Fig. 1.

Referring first to Figs. 1 and 2, the bearing illustrated is substantially of the kind presented in the Bright application previously referred to, and comprises an outer casing member A, an inner casing member B, with two series of balls C and D between them. The series of balls C travel upon the tracks or ways $a'$ and $b'$, and the series of balls D travel upon the tracks or ways $a^2$, $b^2$, it being noted that the tracks or ways $a'$, $a^2$, of the casing member A are separated by the projecting rib $a^3$, and that the tracks or ways $b'$, $b^2$, of the casing member B, are formed as grooves, all as described in the said application. In the Bright case, one of the casing members is formed with a filling opening through which the balls of one or both of the series are introduced into assembled position. The present invention, however, employs a different method of assemblage, which proceeds from the formation of the interior recess E, which is shown by way of example in the casing member B. This recess may have any desired configuration or capacity, although I prefer to form it as a circumferential groove extending entirely around the casing member B and communicating with one of the raceways for instance that constituted by the tracks or ways $a'$, $b'$, as shown in the drawings. The method of assemblage will be obvious from an inspection of Fig. 2. The series of balls D are placed in the track or way $b^2$, and the series of balls C are temporarily located in the recess or groove E, after which the casing member A may be passed thereover and brought into position, by being moved in the direction indicated by the arrow. When the casing members assume their normal relative positions, that is to say, when the series of balls D are properly located in their tracks or ways $a^2$, $b^2$, the balls C may be transferred from the groove or recess E to their tracks or ways $a'$, $b'$, which last operation may be performed in any desired manner, as for instance by operating a tool from the opposite side of the bearing and between the balls of the series D. It will be seen that the parts will then assume the position shown in Fig. 1 with the rib $a^3$ between the series of balls C, D, and in such manner that the several parts of the bearing will be mounted in operative position and firmly locked therein, and this particularly in the embodiment under discussion, for the reason that radial pressure upon the casing member A tends to move the two series of balls C and D outwardly, as described in the Bright application. As shown in Figs. 1 and 2, an additional means is provided to insure the retention of the balls C in assembled position, namely, the junction or line $e'$ at which the surface of the recess or groove E joins the track or way $b'$, it being noted that this line is separated from the nearest corner of the rib $a^3$ by a distance somewhat less than the diameter of a ball, and that consequently after the balls are mounted in assembled position, they cannot return therefrom into the groove or recess E, except in the event of accident or until transferred thereto intentionally. The constriction of the passage from the recess to the raceway necessitates a certain amount of forcing and distortion during the passage of the balls from one to the other, and this is permitted by the deformability and elasticity of the material of the parts. The transferal of the rolling elements from the recess to the raceway may also be accomplished in other ways, as by any expansion of the outer casing member or contraction of the inner casing member, or both, as for instance by the respective applications of heat or cold thereto, or both, and in other equivalent ways. Again, the amount of forcing may be reduced or entirely done away with (see Fig. 5) by forming a cut or notch G in the line of junction $e^5$ between the surface of the recess or groove $E^6$ and the track or way $b^5$, the balls being brought successively into position and then passed through the cut or notch G into the raceway. The method of disassembling is the reverse of that already described, namely, the balls C are passed or forced into the groove or recess E, after which the casing member A may be withdrawn in the direction opposite to that of the arrow in Fig. 2. As previously stated, I prefer to form the recess E in the form of a circumferential groove, but this is not essential to the practice of my invention, for the reason that a recess or cavity of any shape or size will be adequate, provided it permits the operation and has the functions previously described. One reason for preferring it in the form of a circumferential groove is that, if for any reason, or due to accident or wear, one or more of the balls of the series be transferred from the raceway to the groove during operation, such displaced ball or balls will travel with the other parts around the circumference of the casing member and without interfering with or preventing the normal operation of the other parts, a result which might easily occur if the groove were not of the circumferential character described.

To show the applicability of my invention to types other than that above described, I have selected and illustrated one or two modifications by way of example. In Fig. 3, the bearing illustrated is of the single-series type and comprises two casing members $A'$ and $B'$, formed respectively with the tracks or ways $a^4$, $b^4$, wherein the series of balls $C'$ are normally located. The inner casing member $B'$ is here formed with a recess or groove $E^2$, wherein the balls are located during assemblage as previously described, this being necessitated in the type shown by reason of the fact that the tracks or ways $a^4$, $b^4$, are extremely deep, thus bringing the flanges of the casing members $A'$, $B'$, into close proximity. The balls $C'$ are therefore temporarily placed in the recess or groove $E^2$, and after the casing members are brought to normal position, the balls $C'$ are transferred from the groove $E^2$ to the raceway, which operation may be effected in any desired manner, as for instance by the passage of a tool through the aperture $E^3$ formed in the casing member $B'$ and communicating with the groove or recess $E^2$. In Fig. 4 I have illustrated another two-series type, consisting of the casing members $A^2$ and $B^2$, between which are mounted the two series of balls $C^2$ and $D^2$. In this instance, I provide one of the casing members with two recesses or grooves $E^4$, $E^4$, adjoining and communicating with the respective raceways of the two series of balls. In this instance, also, the flanges or lands of the two casing members are in close proximity, and after the assemblage of the casing members the two series of balls may be transferred from the grooves or recesses E⁴, E⁴, to the raceways in any desired manner, as for instance by passing a tool through the apertures E⁵, E⁵, formed in the casing member B² and communicating with the grooves or recesses E⁴, E⁴. These two modifications have been shown simply by way of example, and obviously many other and similar variations will suggest themselves to those skilled in the art without departing from the spirit of my invention.

Having thus described my invention, its construction and mode of operation, what I claim and desire to secure by Letters Patent of the United States is as follows:

1. In an anti-friction bearing, the combination of casing members and rolling elements located therebetween, the said casing members being formed with a raceway for the rolling elements, and also with an interior recess of such size and so located as to receive a plurality of rolling elements at one time and to retain them out of effective engagement with the others parts, so that the normal rotational operation of the assembled bearing will not be impeded thereby.

2. In an anti-friction bearing, the combination of casing members and rolling elements located therebetween, the said casing members being formed with a raceway for the rolling elements and also with a groove extending entirely around the periphery of the bearing to afford a temporary lodgment for the rolling elements.

3. In an anti-friction bearing, the combination of casing members and rolling elements located therebetween, the said casing members being formed with a raceway wherein the rolling elements normally travel in assembled position, and also with an interior recess communicating with the raceway, so that the rolling elements may be transferred from one to the other, the said recess being of such size and so located as to receive a plurality of rolling elements at one time and to retain them out of effective engagement with the other parts, so that the normal rotational operation of the assembled bearing will not be impeded thereby.

4. In an anti-friction bearing, the combination of casing members and a plurality of series of rolling elements located therebetween, the said casing members being formed with a plurality of raceways for the respective series of rolling elements and also with an interior recess adjoining and communicating with one of the raceways, so that the rolling elements may be transferred from one to the other, the said recess being of such size and so located as to receive a plurality of rolling elements at one time and to retain them out of effective engagement with the other parts, so that the normal rotational operation of the assembled bearing will not be impeded thereby.

5. In an anti-friction bearing, the combination of casing members and rolling elements located therebetween, the said casing members being formed with a raceway for the rolling elements, and one of the casing members being formed with an interior recess of such size and so located as to receive a plurality of rolling elements at one time and to retain them out of effective engagement with the other parts, so that the normal rotational operation of the assembled bearing will not be impeded thereby.

In testimony whereof I have affixed my signature in presence of two witnesses.

HENRY HESS.

Witnesses:
THEO. H. M'CALLA,
NETTIE L. HAHN.

Copies of this patent may be obtained for five cents each, by addressing the "Commissioner of Patents, Washington, D. C."